Figure 1:
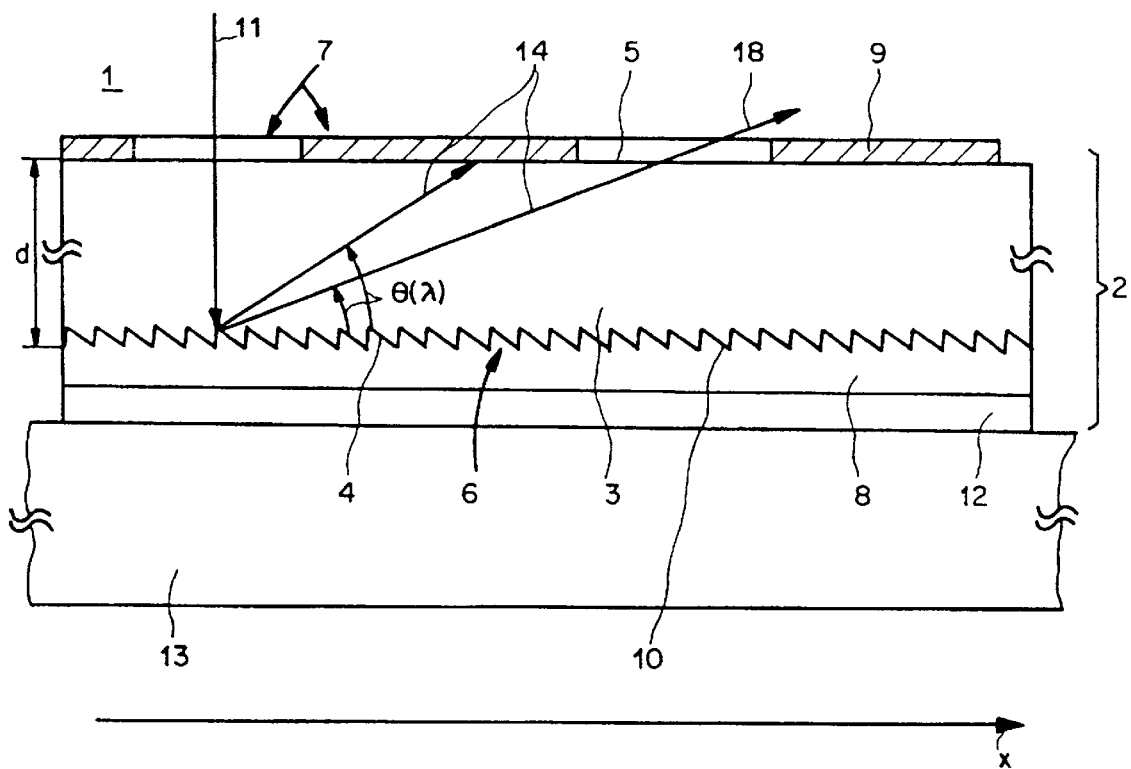

United States Patent [19]
Tompkin et al.

[11] Patent Number: 6,060,143
[45] Date of Patent: May 9, 2000

[54] OPTICAL INFORMATION CARRIER

[75] Inventors: Wayne Robert Tompkin, Ennetbaden; Rene Staub, Cham, both of Switzerland

[73] Assignee: OVD Kinegram AG, Zug, Switzerland

[21] Appl. No.: 09/077,046

[22] PCT Filed: Nov. 14, 1996

[86] PCT No.: PCT/EP96/04987

§ 371 Date: May 18, 1998

§ 102(e) Date: May 18, 1998

[87] PCT Pub. No.: WO97/19820

PCT Pub. Date: Jun. 5, 1997

[51] Int. Cl.$^7$ ............................................. B32B 3/02
[52] U.S. Cl. .................... 428/64.1; 428/64.4; 428/195; 428/201; 428/209; 428/457; 428/913; 428/916; 369/275.1
[58] Field of Search ................... 428/64.1, 64.4, 428/195, 201, 209, 457, 913, 916; 369/275.1

[56] References Cited

U.S. PATENT DOCUMENTS

| | | | |
|---|---|---|---|
| 5,411,296 | 5/1995 | Mallik | 283/86 |
| 5,712,731 | 1/1998 | Drinkwater | 359/619 |
| 5,714,213 | 2/1998 | Antes | 428/30 |
| 5,875,170 | 2/1999 | Tompkin | 369/275.1 |
| 5,886,798 | 2/1999 | Staub | 359/2 |

*Primary Examiner*—Elizabeth Evans
*Attorney, Agent, or Firm*—Proskauer Rose LLP

[57] ABSTRACT

An optical information carrier is in the form of a composite laminate having a carrier foil. The underside and the top side of the carrier foil are provided with optically effective structures. The carrier foil is approximately transparent for light in a predetermined spectral range. The structures allow light impinging on the top side to penetrate at least partially into the composite laminate. The structures on the underside are microscopically fine relief structures which are covered with a base layer whose refractive index differs from the refractive index of the carrier foil in at least a portion of the electromagnetic spectrum so that the structures on the underside at least partially reflect and diffract the light which has penetrated into the composite laminate. The structures on the top side in turn modify the diffracted light. The interplay of the two structures provides manifold characteristic optical effects such as moire effects and light guide effects. It is also possible in that way to produce optical storage means, retroreflectors and other security features, being well protected from foreign access.

18 Claims, 8 Drawing Sheets

OPTICAL INFORMATION CARRIER

The invention concerns an optical information carrier.

Optical information carriers having an optical diffraction structure are suitable for example for increasing the level of safeguard against forgery and for conspicuously identifying articles of all kinds and can be used in particular in relation to security and bond documents, passes, payment means and similar articles to be safeguarded.

European patent specification EP 328 086 discloses an optical information carrier in which a first hologram is stored in a layer which is metallised over its entire surface, and a second hologram is stored in a partially metallised layer which is disposed thereover. The two holograms are arranged at a small spacing and are visible at different viewing angles. There is no correlation of any kind between the two holograms. An optical information carrier of that kind can be copied with conventional holographic methods.

European patent specification EP 12 375 discloses an optical information carrier in which three grating layers with three colour component images are arranged in mutually directly superimposed relationship. The production of that information carrier is expensive as the three grating layers must be arranged accurately so as to afford an image which is satisfactory from the colour point of view.

British patent specification GB 2 237 774 discloses production processes for holograms, in which two individual holograms are glued together or in which a print layer is applied directly over the hologram. Specific optical effects which could arise out of the interplay of the two holograms or the hologram and the print layer are not discussed.

German laid-open application (DE-OS) No. 23 50 109 discloses a foil serving as a holographic recording medium. Formed both in the underside and in the top side of the foil are relief patterned which represent items of holographic information. The holograms are recorded using a special procedure so that the holograms which are stored on both sides of the, foil can be read off separately. Optical correlation between the holograms on one side and the holograms on the other side is prevented as far as possible by virtue of the special recording procedure.

The object of the present invention is to propose an optical information carrier which has optical security features that cannot be copied using holographic methods, and which can be easily produced in large numbers.

That object is attained on the basis of the idea of providing the optical information carrier with at least two optically effective structures which are arranged in different planes and which jointly produce a characteristic optical effect. At least one of the two structures is a microscopically fine relief structure. In that respect information carriers in which a high level of register accuracy as between the two structures is required are particularly difficult to forge.

Figure 2:
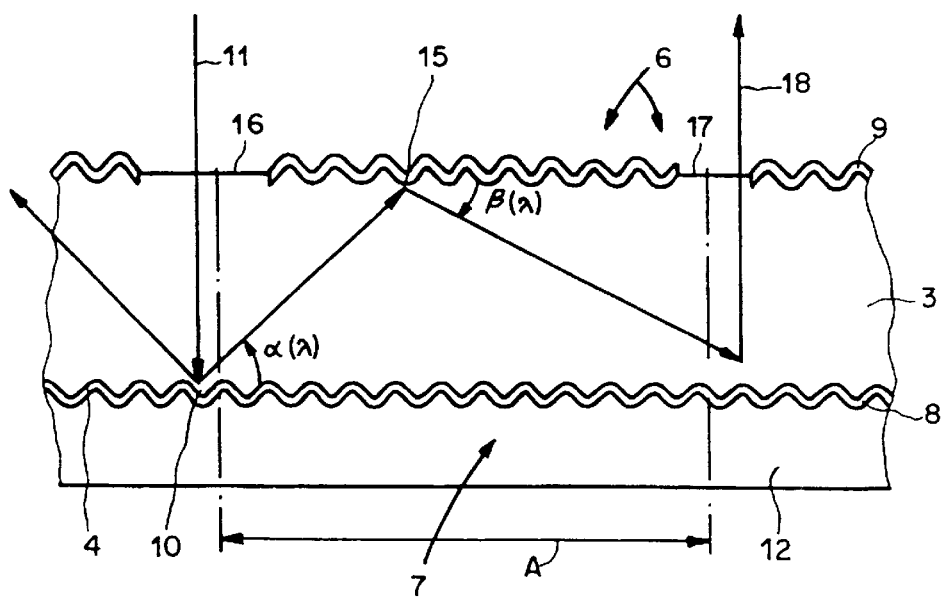
Figure 3:
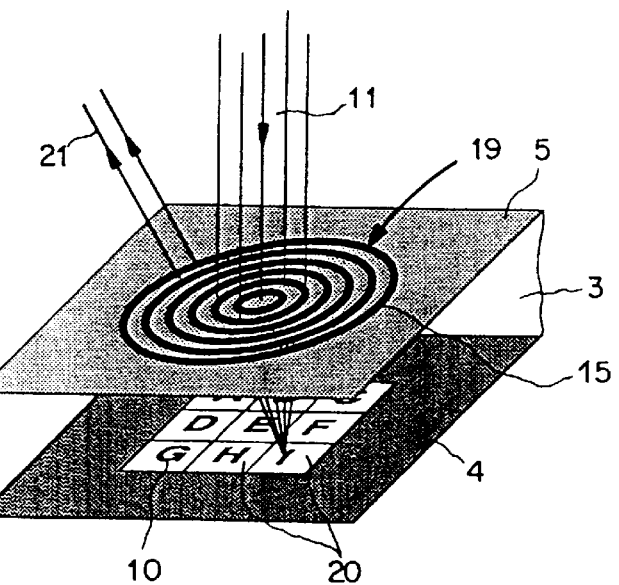
Figure 4:
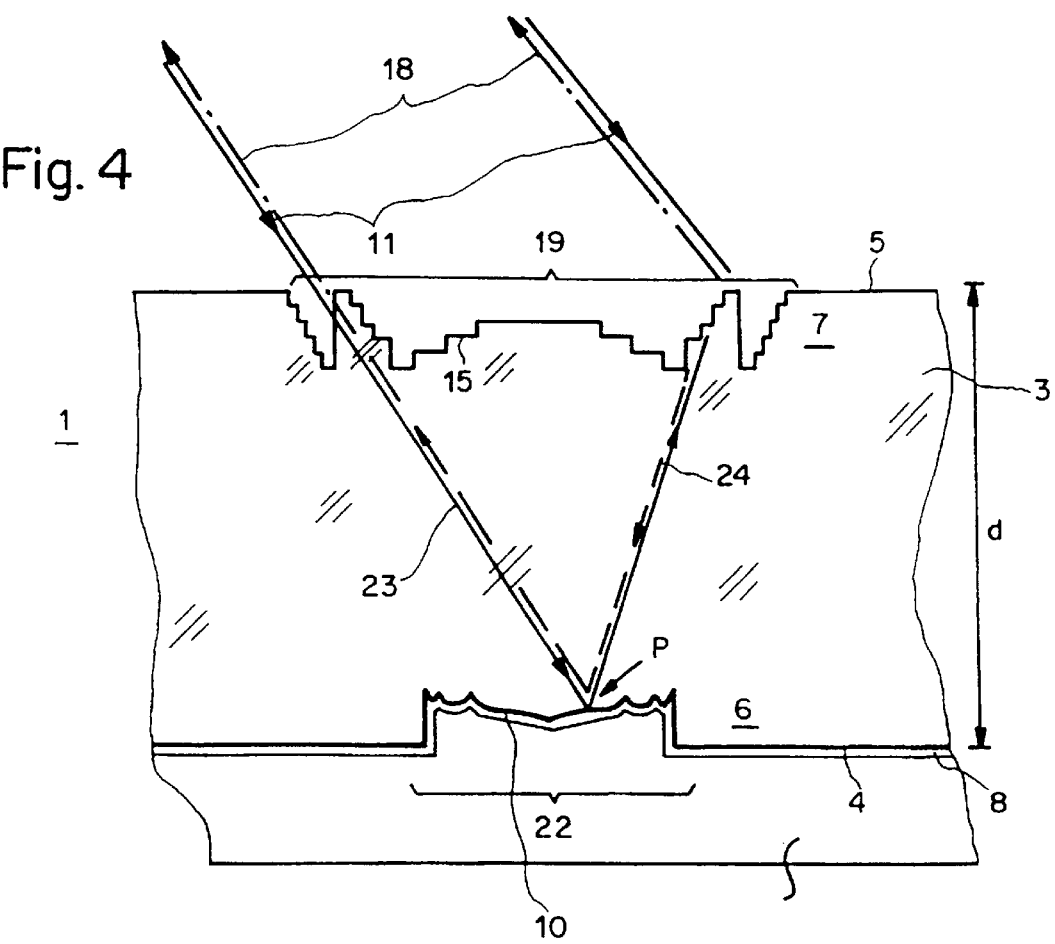
Figure 5:
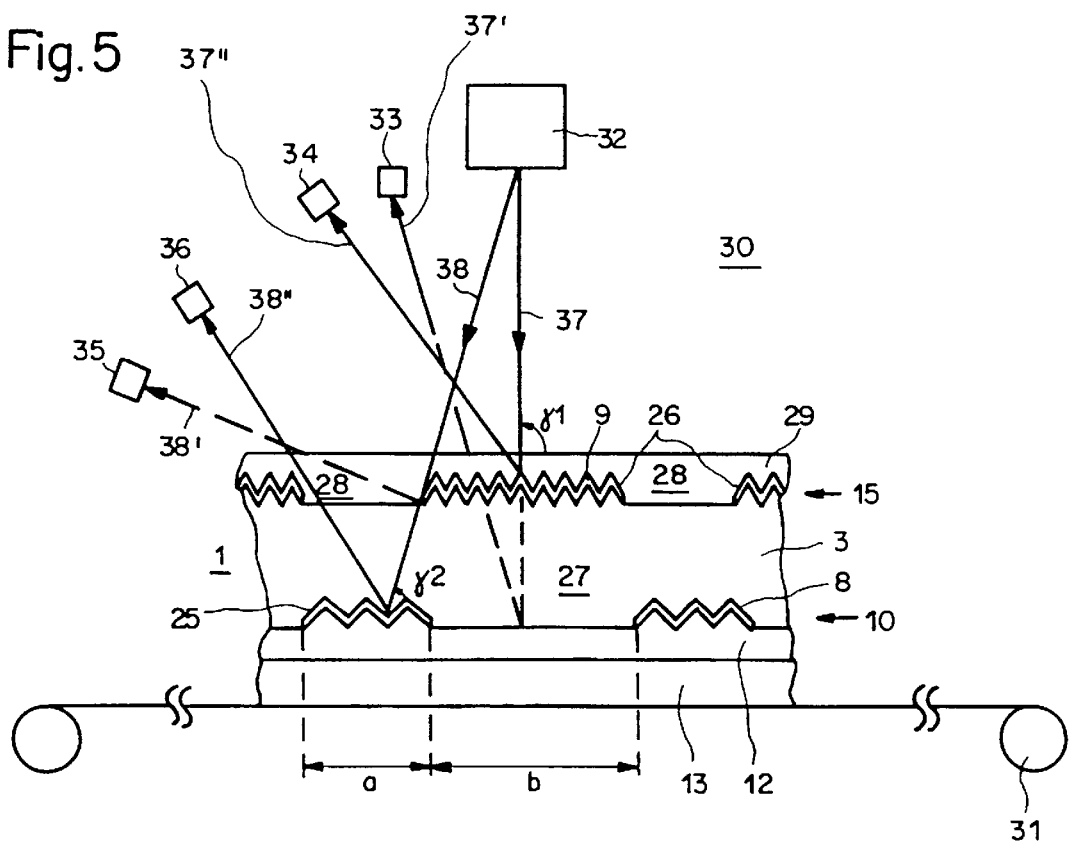
Figure 6:
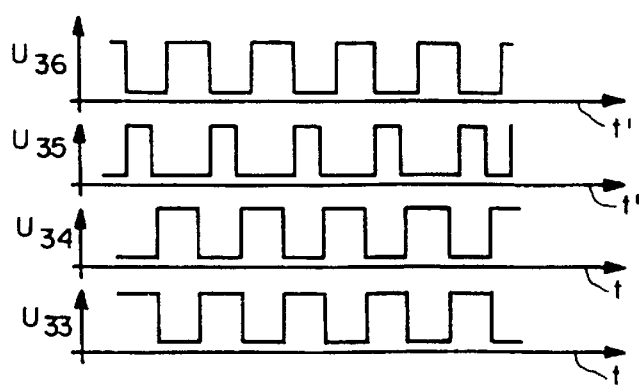
Figure 7:
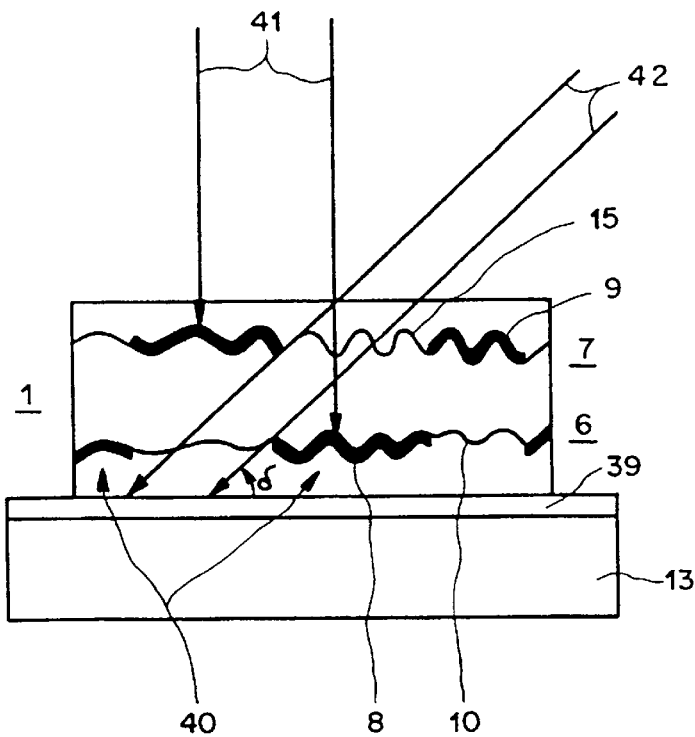
Figure 8:
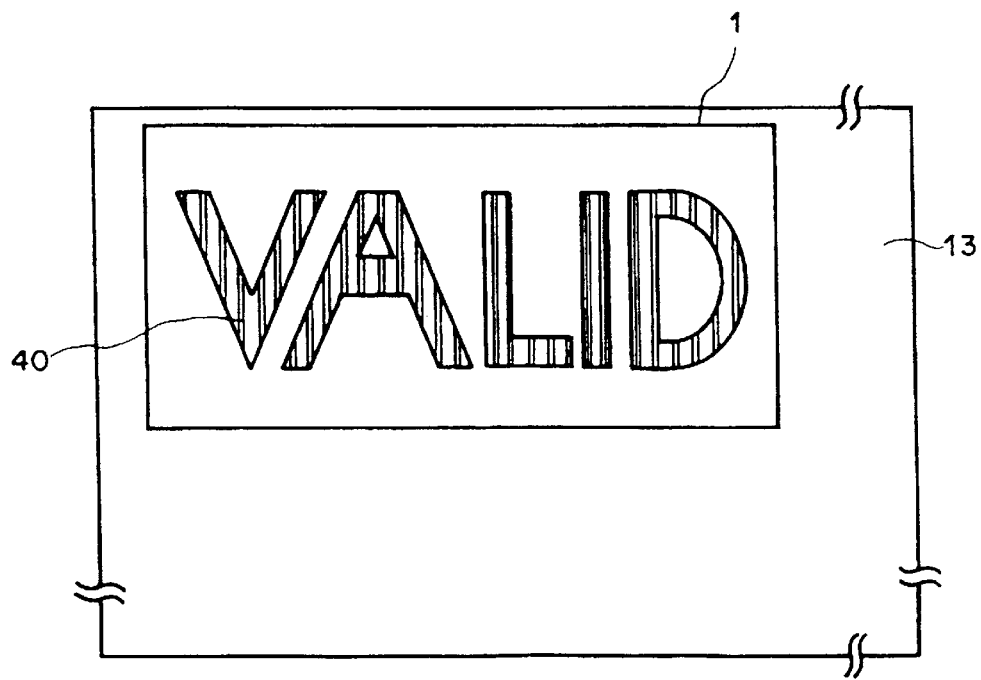
Figure 9:
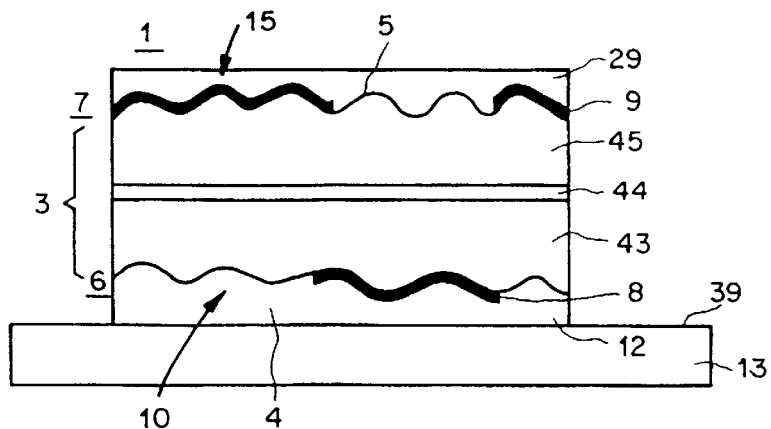
Figure 10A:
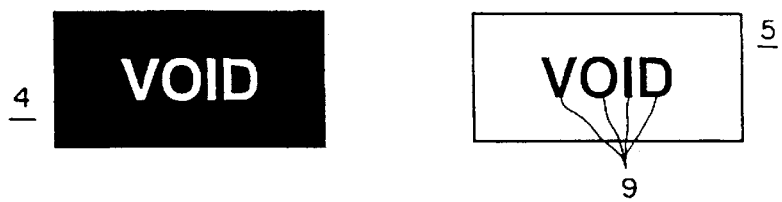
Figure 11:
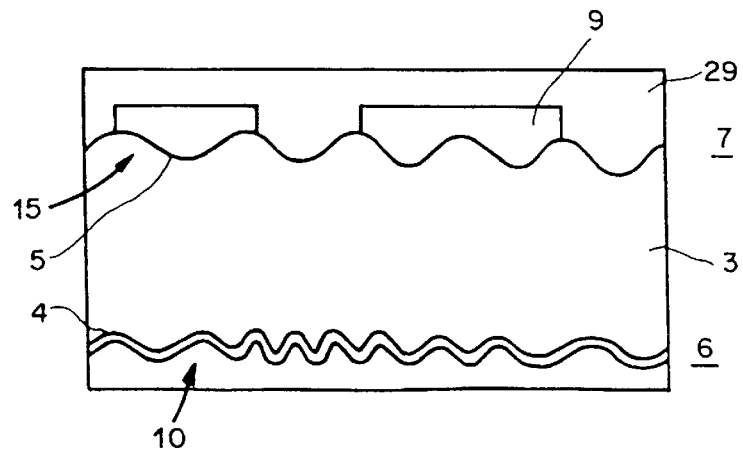
Figure 12:
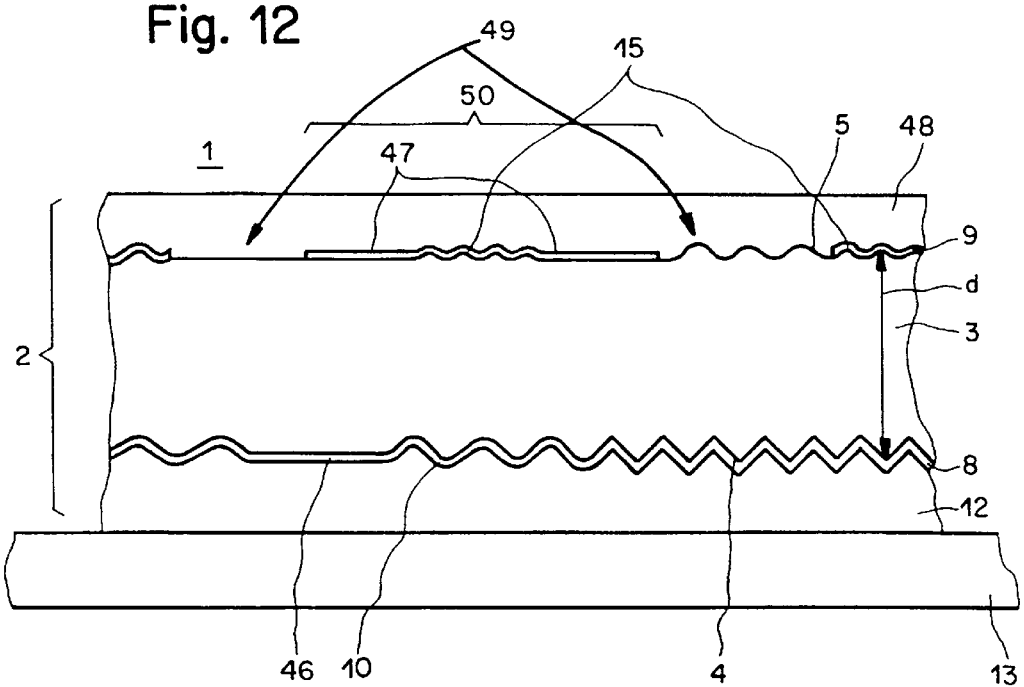
Figure 13:
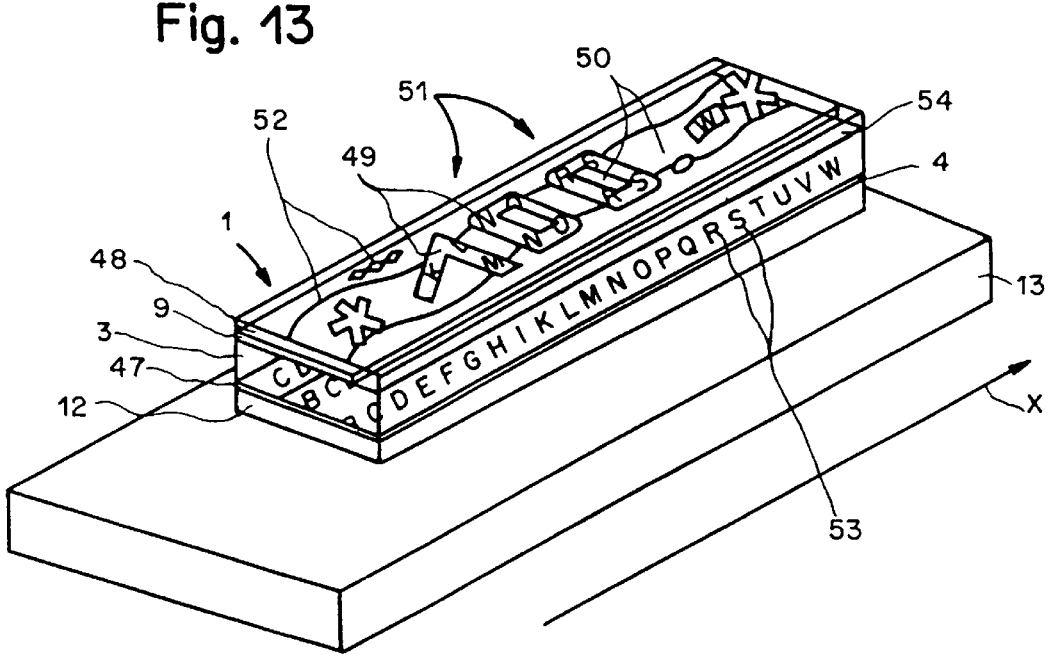
Figure 14:
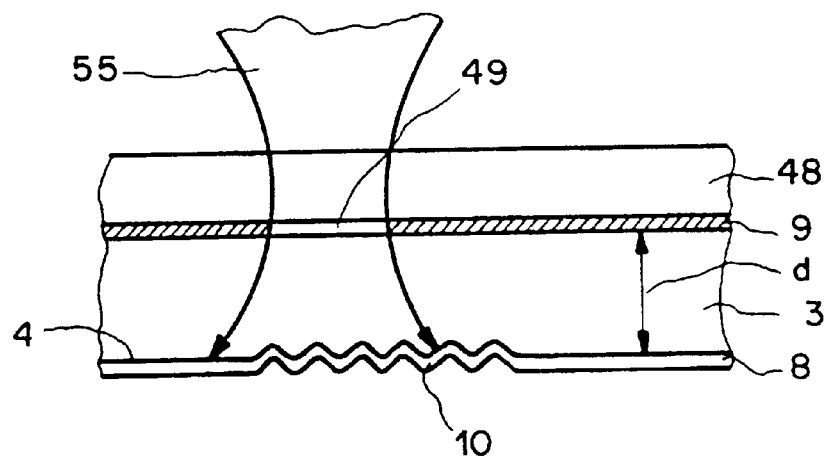
Figure 15:
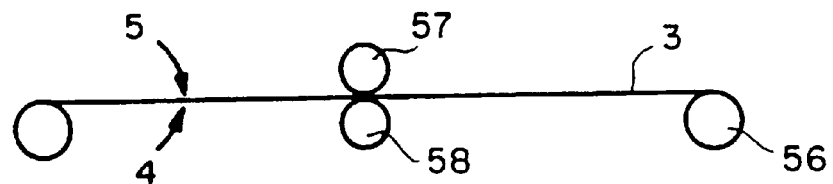
Figure 16:
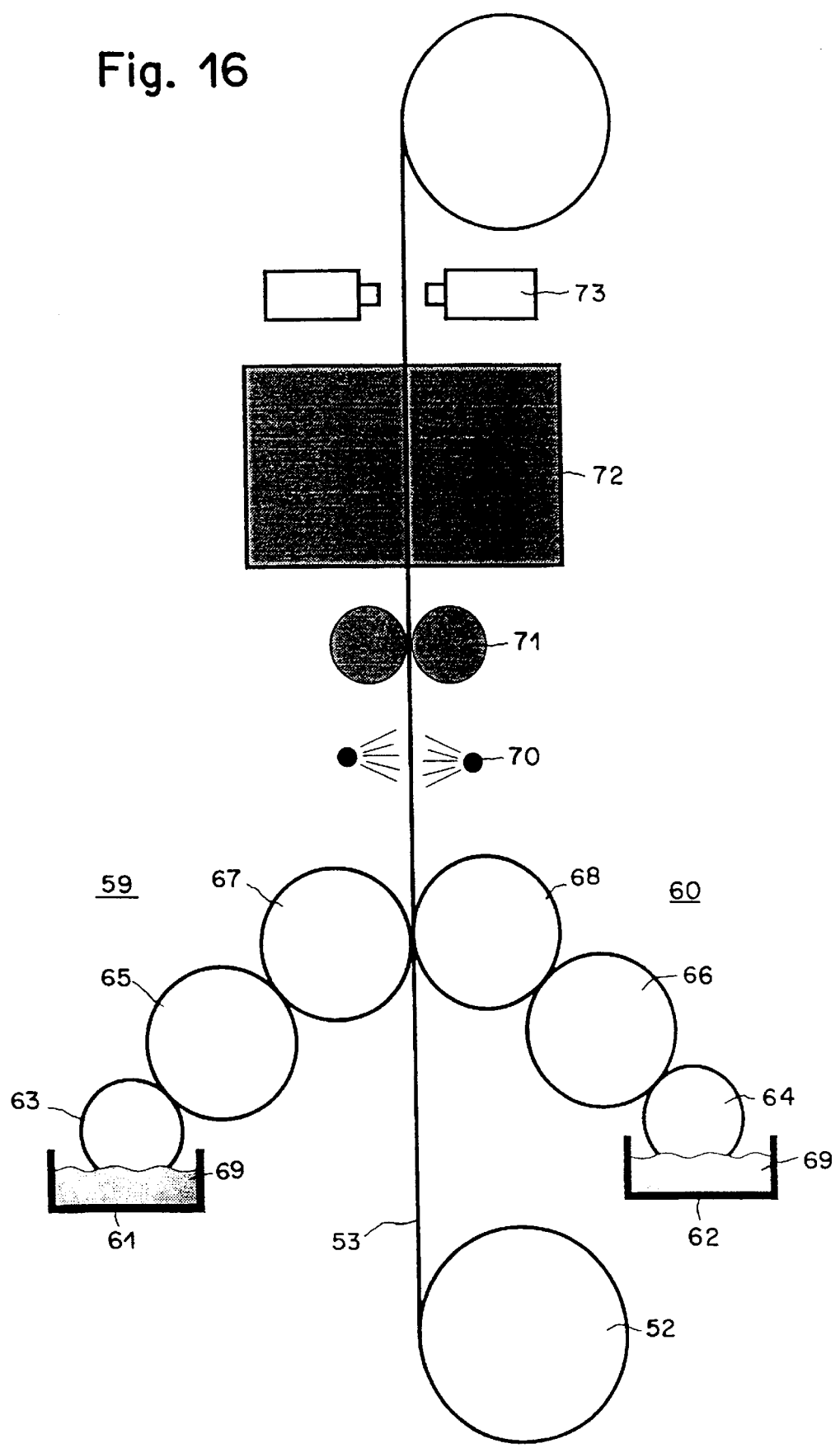

Embodiments of the invention are described in greater detail hereinafter with reference to the drawings in which:

FIG. 1 shows an information carrier with optically effective structures for producing moiré effects, FIG. 2. shows an information carrier with light conductor properties, FIG. 3 shows an information carrier with an integrated microlens, FIG. 4 shows an information carrier acting as a retroreflector, FIG. 5 shows an information carrier with security features based on shadowing effects, FIG. 6 shows signal diagrams, FIGS. 7 and 8 show an information carrier in which certain items of information are visible only with an inclined viewing direction, FIG. 9. shows an information carrier having relief structures with a diffraction effect, which are arranged in different planes, FIGS. 10a and b show special features of the information carrier of FIG. 9, FIG. 11 shows an information carrier with a concealed security feature, FIG. 12 shows an information carrier with microscopically fine relief structures which are embossed on both sides, FIG. 13 shows a cheque with a fixedly predetermined value or a value which can be irreversibly written in, FIG. 14 shows an information carrier which can be individualised with laser light, FIG. 15 shows an arrangement for embossing relief structures in register relationship, and FIG. 16 shows an arrangement for applying structured layers in register relationship.

In the drawings, which are not to scale, FIG. 1 shows a view in cross-section of an optical information carrier 1 in the form of a composite laminate 2. The core of the composite laminate 2 is formed by a carrier foil 3 whose thickness d is at least 20 micrometres. The carrier foil 3 may however also be substantially thicker, for example 100 or 200 micrometres. The underside 4 and the top side 5 of the carrier foil 3 are provided with optically effective structures 6, 7, the interplay of which produces very different but characteristic optical effects. The optically effective structures 6, 7 can be formed by shaping microscopic or macroscopic relief structures in the underside and top side 4 and 5 respectively and/or by applying further layers 8, 9 to the underside and the top side 4 and 5 respectively.

In a first embodiment the basal structures 6 on the underside 4 of the carrier foil 3 are microscopically fine relief structures 10 which are covered by the base layer 8. The optical refractive index of the base layer 8 differs from the refractive index of the carrier foil 3 at least in a portion of the visible electromagnetic spectrum. The geometrical parameters of the relief structures 10, line spacing and profile height, are typically in the range of some tenths of a micrometre to some micrometres. The profile height however may also be only some tens of nanometres. The relief structures 10 diffract impinging light and produce optical-diffraction effects which can be perceived by the human eye. The luminosity of the relief structures 10 depends on the difference in the refractive indices of the layers 3, 8 directly embedding the relief structures 10. The top structures 7 on the top side 5 of the carrier foil 3 are formed by the cover layer 9 by the cover layer 9 only partially covering the carrier foil 3. Accordingly the top structures 7 form on the top side 5 a microscopic pattern comprising surfaces which are formed by the cover layer 9 and which cover the top side 5, and gaps where the top side 5 is exposed. The dimensions of the gaps, in an x-direction, are in the range of ten micrometres and more, typically in the range of 20 to 30 micrometres. In another direction the dimensions of the gaps can be substantially greater, for example a millimetre. The cover layer 9 is not transparent in relation to visible light. It is for example a thin metal layer or a dyestuff layer applied by a printing procedure.

In general the layer 8 is covered by an adhesive layer 12 so that the information carrier 1 can be directly joined to the surface of a base card 13, for example a banknote, an identity card, a document or the like. The layers 12, 8, 3 and 9 form the composite laminate 2 which cannot be separated without being destroyed so that items of information which are present in the form of the structures 6 and 7 are embedded in the composite laminate 2 in such a way as to be safeguarded against forgery.

When illuminated under normal illumination conditions, for example in daylight, the composite laminate 2 produces so-called moiré effects. White, polychromatic light 11 which passes into the interior of the composite laminate 2 through the gaps in the cover layer 9 is reflected at the relief structures 10 and diffracted in directions 14 whose angles θ(λ) depend on the direction of incidence and the wavelength λ of the light 11. The top structures 7 form a mask which allow diffracted light 18 to issue from the composite laminate 2 again only where there is no cover layer 9 on the top side 5. The structures 6 and 7 therefore provide together that certain colour components of the light 11 are filtered out in dependence on the angle of incidence of the light 11, and do not occur in the light 18 that issues. It will be appreciated that in that respect the thickness d of the carrier foil 3 also plays a decisive part. Because of the moiré effect, the viewer sees a changing play of colours by virtue of altering the direction of incidence, for example by turning and/or tilting the information carrier 1. The structures 6, 7 themselves cannot be perceived by the naked eye.

The relief structures 10 are for example a grating with straight or curved grooves. The use of relief structures 10 with an asymmetrical, for example sawtooth-shaped profile configuration provides that the intensity of the light which is diffracted into the positive diffraction orders is greater than the intensity of the light which is diffracted into the negative diffraction orders so that the luminosity of the play of colours when the information carrier is turned through an angle of 180° alters markedly. If the grating parameters of the relief structures 10 on the underside 4 locally depend on the location, the colour pattern produced with a given angle of incidence of the light 11 exhibits locally different colours. By virtue of suitable dimensioning of the pattern formed by the structures 7 the moiré effects can be such that the gaps for example never appear blue as blue light is filtered out. Such an effect cannot be achieved with diffraction gratings which are arranged in one plane.

If the base layer 8 and the adhesive layer 12 are in the form of transparent lacquer layers and if the free surface area which is not covered by the cover layer 9 is of a sufficiently large proportion, then the surface of the base card 13 and therewith for example information printed on the base card 13 are visible through the composite laminate 2 which is glued in position. If the base layer 8 in contrast is a metallic layer which almost completely reflects impinging light, then the glued-on composite laminate 2 conceals the surface of the base card 13.

FIG. 2 shows a second embodiment with diffraction structures on the underside and the top side 4 and 5 respectively of the carrier foil 3. Relief structures and 15 are formed in the surfaces 4 and 5 of the carrier foil 3. The two layers 8 and 9 which cover the relief structures 10 and 15 are metallic reflection layers. The base layer 8 is metallised over its entire surface area while the cover layer 9 is only partially metallised. Provided in the cover layer 9 are at least two openings 16, 17 through which light 11 can penetrate into and issue again from the composite laminate 2. The light 11 which enters through the opening 16 is diffracted and reflected at least once or a plurality of times at both relief structures 10 and 15 until it can leave the composite laminate 2 again through the opening 17, as issuing light 18. The openings 16, 17 are for example at a spacing A of a millimeter. The structures 6 and 7 thus serve as a light guide. As the diffraction angles α(λ) and β(λ) depend on the wavelength λ, when the openings 16 and 17 are suitably positioned and of a suitable extent, the arrangement also provides a filter action so that for example in the event of illumination with white light 11 the openings 16 and 17 shine in colour. By suitable selection of the parameters of the relief structures 10, 15 and suitable selection of the spacings A between selected openings 16, 17, it is possible for different openings 16, 17 to appear in different colours, when viewing under white light conditions. By turning and/or tilting the information carrier 1, individual openings 16, 17 can appear in colour, and they can change their colour and also fade again. Likewise a selection of the relevant parameters is possible so that, upon illumination with monochromatic light of a first, for example red colour, the openings 16, 17 shine red while, upon being illuminated with monochromatic light of a second, for example green colour, they remain dark.

That arrangement is suitable both for producing visually verifiable effects and also for machine-readable authenticity checks. The complexity and thus the degree of difficulty of forgery can be increased as desired by providing more than two layers in superposed relationship, having diffracting structures 6, 7 and openings 16, 17.

The relief structures 15 may perform further security-relevant functions insofar as the relief structures 15, in the portions of the surface 5 which are not required for the light guide function, are so designed and coated with the layer 9 that they produce optical-diffraction effects as are known for example from European patent specifications EP 105 099 or EP 375 833. It is further possible for predetermined regions of the structures 7 to be covered with a further layer, for example a print layer, in order to avoid undesired, visually perceptible diffraction effects at the relief structures 15.

The optical information carriers described with reference to FIGS. 1 and 2 are distinguished by a high level of safeguard against forgery as the structures 6 arranged in the lower plane are not accessible either optically or in any other fashion. The structures 6 are however as equally significant as the structures 7 for producing the desired light guide and filter effects.

FIG. 3 is a perspective view showing the surfaces 4 and 5 of the carrier foil 3. A microlens 19, in the present case a Fresnel lens, in the configuration of a macroscopic relief structure, is formed into the surface 5 as the structure 7 (FIG. 1). Nine surface portions 20 are arranged matrix-like in mutually juxtaposed relationship on the underside 4 as the structure 6 (FIG. 1), wherein the central one of the nine surface portions 20 is disposed approximately at the focal point of the microlens 19. The information present in the surface portions 20 is symbolically represented in the drawing by letters. The focal length of the microlens 19 and the thickness d of the carrier foil 3 are therefore matched to each other. With a typical diameter of the microlens 19 of 100 μm and a profile height of about 5 μm, focal lengths in the range of 100 μm to 250 μm can readily be achieved. Formed in the surface portions 20 are microscopic relief structures 10 which can fulfill various functions. The microlens 19 and the associated nine surface portions 20 form an information unit. The information carrier 1 preferably contains a plurality of mutually juxtaposed microlenses 19 with associated surface portions 20.

The microlens 19 focusses incident light 11 in dependence on the direction of incidence onto one surface portion 20 or another so that only the relief structures 10 of a single surface portion 20 are illuminated. In an information carrier 1 which is advantageously in the form of an optical ROM, the diffraction structures 10 diffract light into one or more beam portions 21 of predetermined direction. The relief structures 10 vary from one surface portion 20 to another, according to the stored information. The information stored in the surface portion 20 can be ascertained by machine, by means of a reading device which is designed to analyse the levels of intensity of the beam portions 21. If for example the predetermined number of directions into which light can be diffracted as a beam portion 21 is eight, then each surface portion 20 can store eight bits: in the case of a bit with the binary value "1", light is diffracted in the corresponding direction, while in the case of a bit with the binary value "0", no light is diffracted into the corresponding direction.

The information carrier can also be in the form of a WORM storage means. In hat case only a single bit can be stored in each surface portion 20. Immediately after production of the information carrier 1 each surface portion 20 has an identical intact relief structure 10 which diffracts light in at least one predetermined direction as a beam portion 21. The intact relief structure 10 represents a bit "1". The operation of reading the bit is effected with a low-intensity light beam. With a high-intensity light beam which is produced by the reading device which is switched into a high-power mode, the relief structure 10 can be altered insofar as it cannot diffract light, or it can no longer diffract sufficient light, in the predetermined directions, as beam portions 21: the altered relief structure 10 represents a bit "0". Comparatively little energy is required to write a bit "0" as the microlens 19 focusses the light onto the relief structure 10 to be destroyed. In our example, nine surface portions 20 serving as a storage cell for a single bit can be read with each microlens 19, wherein addressing of the correct surface portion 20 is effected by adjusting the direction of incidence of the light 11.

In another configuration the surface portions 20, arranged at the same location, of all information units, respectively form pixels of an image. Therefore nine images can be represented with nine surface portions 20, wherein one or other of the nine images is respectively made visible in dependence on the direction of incident light 11. An image can be formed not only as a conventional print image but also as an image which is composed of diffraction structures, wherein the parameters of the diffraction structures may vary from one pixel to another, that is to say from the associated surface portion 20 to the next associated surface portion 20. Such an image can therefore produce kinematic diffraction effects, that is to say, with a fixed direction of incidence of the light, at different viewing angles, the image conveys different optical impressions, as are known for example from European patent specifications EP 105 099 or EP 375 833.

FIG. 4 shows the information carrier 1 in which the top side 5 of the carrier foil 3 has once again as the structure 7 a relief structure 15 which acts as a microlens 19. The underside 4 has as the structure 6 the relief structure 10 which is metallised with the layer 8 and which acts as a reflector 22. Light 11 which is incident in parallel relationship is focussed by the microlens 19 onto a given point P on the reflector 22 in dependence on the direction of incidence, as a plurality of beam portions 23, 24. The relief structure 10 of the reflector 22 is now such that the beam portion 23 which locally impinges on the point P is reflected and/or diffracted in the opposite direction to the beam portion 24 impinging on the point P. That provides that the light impinging onto the microlens 19 is reflected in the opposite direction. The combination of the microlens 19 and the reflector 22 thus forms a retroreflector. The retroreflector can be produced in a simple fashion, for example by embossing the relief structures 10, 15 in register relationship into the carrier foil 3 of thermoplastic material.

An example of use is a banknote in which a plurality of retroreflectors are arranged along a track at predetermined spacings, for example like a bar code. The information stored in the bar code can be read out with an optical reading device when the track is moved past the reading head. As the light reflected at the retroreflectors is always reflected back into the direction of incidence, the information can be read without any difficulty, even in the event of the banknote fluttering as a result of a high speed of transportation movement.

FIG. 5 shows an embodiment of the information carrier 1 in which microscopically fine relief structures 10 and 15 respectively which have a diffraction effect are formed in the surfaces 4, 5 of the carrier foil 3, for example by embossing. The relief structure 10 comprises grating structures 25 which have a diffraction effect and which are locally limited in their dimension a and which are separated by gaps 27 of a width b, the gaps being arranged at regular spacings. The relief structure 15 comprises locally limited grating structures 26 whose dimension is equal to the width b and which are separated from each other by unembossed surface portions 28 of the dimension a. Only the grating structures 25, 26 are covered with the layers 8 and 9 respectively which are adapted to be reflecting while the surfaces 4, 5 of the carrier foil 3 are exposed in the gaps 27 and the surface portions 28. The values a, b are typically some tens of micrometers. The relief structure 15 is further levelled off with a lacquer layer 29, while the relief structure 10 is glued onto the document 13 with the adhesive layer 12. The document 13 is disposed in a reading device 30 which includes a transport means 31, a light source 32 and four photodetectors 33, 34, 35 and 36. The light source 32 emits two light beams 37, 38 which impinge on the grating structures 26 and/or 25 at different angles γ1 and γ2. The photodetectors 33–36 are so arranged and the parameters of the two grating structures 25, 26 are so selected that a diffracted light beam 37' falls on the photodetector 33 when the light beam 37 is diffracted at the grating structure 25, the diffracted light beam 37" falls on the photodetector 34 when the grating structure 26 diffracts the light beam 37, the diffracted light beam 38' falls on the photodetector 35 when the light beam 38 impinges on the grating structure 26 at the angle γ2 and that the diffracted light beam 38" falls on the photodetector 36 when the light beam 38 impinges on the grating structure 25.

FIG. 6 shows the signals U33, U34, U35 and U36 at the output of the photodetectors 33–36 as a function of the time t and t' respectively, when the transport means 31 moves the document 13 with the grating structures 25, 26 past the light source 32. The time axis t' is displaced relative to the time axis t by a time duration $t_0$. The time duration $t_0$ depends inter alia on the angles γ1 and γ2, the thickness of the grating foil 3 and the grating line spacing of the grating structure 25, said spacing also determining the diffraction angle. The signal pulses U35 and U36 are shortened in a specific manner as a result of shadowing by the grating structure 26. The signals U33, U34, U35 and U36 are advantageously converted into digital binary signals and processed by suitable logic circuits to afford a single signal U whose variation in respect of time contains the information as to whether the document 13 is genuine. In the case of a forged copy in which the grating structures 25 and 26 are arranged in one plane, no shadowing effects occur in the reading-out operation and thus a different signal U occurs. Shadowing effects also occur when the grating structure 25 is present throughout and is metallised and there are no gaps 27.

FIGS. 7 and 8 are a view in cross-section and a plan view of the information carrier 1 applied to the document 13. The surface 39 of the document 13, which is covered by the information carrier 1, is at least partially provided with visually or optically machine-readable information which was applied for example by a printing procedure. The structures 6, 7 are microscopically fine identical relief structures 10, which are partially covered by the reflecting layer 8 and 9 respectively. The partial covering of the relief structures by the layer 8 is such that, outside the script formed by the letters of the word "VALID", the layer 8 is continuous and that the layer 8 within the letters, forms parallel stripes 40 which extend in a direction to the edge of the letters, but in a direction perpendicular thereto they are only some tens of micrometers in width. The spacing between the stripes 40 is also some tens of micrometers, for example 50 or 100 micrometers. The layer 9 is of a complementary configuration to the layer 8 so that the surface 39 is not visible in the case of a perpendicular illumination direction 41 and parts of the surface 39 are visible upon illumination at an inclined angle of incidence δ and an inclined viewing direction 42, in which case "VALID" is perceptible. The width of the stripes 40 and the thickness of the carrier foil 3 determine the angle δ at which the word "VALID" can be perceived. The image content which appears within the word "VALID" is determined by the image content of the surface 39 of the document 13. As the relief structures 10, 15 are identical and as the spacing of the relief structures 10, 15 is in the range of 30 to 100 micrometers, with a perpendicular illumination direction an image impression can be perceived by eye, as if there were only a single structure 6 or 7 which is reflective over its entire surface. The configuration of the relief structures 10, 15 is not subjected to any limitations. The geometrical parameters of the relief structures 10, 15 may vary locally in order to produce optical-diffraction effects of the kind described for example in European patent specifications EP 105 099 or EP 375 833.

FIG. 9 shows the information carrier 1 in which the carrier foil 3 itself comprises three layers 43, 44 and 45. The outer layers 43, 45 are embossable layers while the central layer 44 is an intermediate layer which is in the form of a wax layer and which permits separation of the two layers 43 and 45 without damage. If separation of the layers 43 and 45 is to be prevented, the layer 44 is an adhesive layer. The thickness of the layers 43, 45 is advantageously at least 10 μm. The intermediate layer 44 can be as thin as may be desired. Formed in the surfaces 4, 5 are microscopically fine relief structures 10 and 15 respectively which are coated entirely or, as shown in FIG. 9, partially, with the dielectric or metallic layer 8 and 9 respectively. With that construction it is possible for the structures 6 and 7 to be produced independently of each other, from a technical point of view, in the form of relief structures 10, 15 having an optical-diffraction effect.

From the configurational point of view however it is important for the spatial frequencies and orientation of the relief structures 10, 15 to be matched to each other in such a way that the images produced upon illumination by the relief structures 10, are perceptible from different viewing directions. If the carrier foil 3 is thicker than about two micrometers then no interference phenomena occur between light diffracted at the two structures 6 and 7, under incident daylight. Depending on whether the layers 8, 9 are applied over the full surface area or only partially and whether they are dielectric or metallic in character, the surface 39 of the subjacent document 13 is at least partially visible. It is also possible for the carrier foil 3 to comprise only one layer.

Figure 10B:

FIG. 10a shows the pattern on the top side 5 and—viewed through the carrier foil 3—that on the underside 4. The layer 8 covers the underside 4 (FIG. 9) completely with the exception of the space occupied by the letters of the word "VOID". In contrast the layer 9 covers the top side 5 only in the surface area occupied by the letters "VOID". As long as the carrier foil 3 formed from the three layers 43 (FIG. 9), 44, 45 is intact, the word "VOID" is not discernible. If however the upper layer 45 is intentionally or unintentionally detached from the rest of the carrier foil 3 then the remaining parts with the layer 43 and the detached layer 45 both carry the feature "VOID" which shows that the value of the document 13 has been cancelled or the document 13 is now valueless. An unauthorised attempt to detach the information carrier 1 from the document 13 and transfer it onto another document is also discerned in that way. FIG. 10b shows another solution for achieving the same effect.

FIG. 11 shows an information carrier 1 which both produces visual optical-diffraction effects and also stores concealed, machine-readable items of information. The dielectric layer 9 has a refractive index n9 which differs from the refractive index n3 of the carrier foil 3 in the visible range by at most 0.2. The difference in refractive index may be greater in the infra-red and/or ultra-violet ranges. The layer 9 forms structures 7 insofar as it covers or exposes the relief structures 15 along a data track in a predetermined manner. The structures 7 contain the optically machine-readable information. The layers 7 are also levelled off by the lacquer layer 29 and protected from damage or destruction. The visual image impression is based on optical-diffraction effects which are produced by the subjacent relief structure 10. The relief structures 10 advantageously only have spatial frequencies and/or azimuth orientations which are different from the spatial frequency and/or azimuth orientation of the relief structures 15 so that, when the information is read out by machine, no light which is diffracted at the relief structures 10 is incident on the photodetectors of the reading device. The lacquer layer 29 advantageously comprises the same material as the carrier foil 3 so that it has the same refractive index as the carrier foil 3. The concealed information is extremely difficult to copy, even with holographic methods.

FIG. 12 is a view which is not to scale of an individualisable optical information carrier 1. The thickness d of the carrier foil 3 which is transparent in the visible spectral range is in the range of 1 to 200 micrometers. Formed in the underside 4 and the top side 5 of the carrier foil 3 are surface regions with different, microscopically fine relief structures 10 and 15 respectively of optical gratings which can be separated by smooth regions 46 and 47 respectively. The cover layer 9 contains visually easily discernible gaps 49 which are separated by surface portions 50 so that the regions of the underside 4, which are under the gaps 49, are visible. The dimensions of the gaps 49 are typically in the range of 0.5 mm to 10 mm. The cover layer 9 is not transparent in relation to visible light. It is for example a thin metal or oxide layer. The thickness of the base layer 8 and the thickness of the cover layer 9 are some tens of nanometres, typically 20–70 nanometres. The relief structure 15 can be levelled off by means of a protective lacquer layer 48 in order to protect the relief structure 15 from mechanical damage. The thickness of the adhesive layer 12 and the thickness of the protective lacquer layer 48 are typically 1–2 micrometers, wherein the thickness of the adhesive layer 12 is matched to the roughness of the surface of the substrate 13 in such a way that the adhesive layer 12 also levels off the rough surface. The entire composite laminate 2 is thus about 4 to 200 micrometers in thickness. The carrier foil 3 itself may also be constructed in the form of a composite laminate, for example a temperature-resistant carrier layer, for example of polyester, which has an embossable lacquer layer on both sides. Materials which can be used for the information carrier 1 are listed for example in European patent application EP 201 323.

The geometrical parameters of the relief structures 10, 15, line spacing and profile height, are typically in the range of some tenths of a micrometer to some micrometers. The profile height however may also be only some tens of nanometers. Further parameters of the relief structures 10, 15 are the profile shape and the orientation of the grating in the plane of the information carrier 1. The relief structures within the surface portions 50 and also the relief structures 10 diffract impinging light and because of the interference of the light beams produce optical-diffraction effects which can be discerned by the human eye, as are known for example from European patent documents EP 105 099, EP 375 833 or EP 490 923. Such kinematic optical effects are also known to the men skilled in the art by the terms holograms, pixelgrams or from products which are marketed under the name KINEGRAM®. There is no need for relief structures 15 with a diffraction effect to be present on the entire area covered by the surface portions 50. As diagrammatically shown in FIG. 12 parts of that surface may be in the form of a flat and thus reflecting plane or in the form of a rough surface for producing an optically matt or comparatively dark impression.

If the free surface which is not covered by the cover layer 9 is of a sufficiently large proportion and the base layer 8 comprises a transparent material whose refractive index is different from that of the carrier foil 3 and if the adhesive layer 12 is a clear bonding agent, then the surface of the substrate 13 and therewith for example information printed on the substrate 13 is visible through the stuck-on composite laminate 2. If in contrast the base layer 8 is a metallic layer over the entire surface area, which almost completely reflects incident light, then the stuck-on composite laminate 2 conceals the surface of the substrate 13.

FIG. 13 is a perspective view which is not to scale showing the substrate 13 in the form of a cheque. The cheque includes a bordered area which serves to receive the information carrier 1 with the representation of a sequence of characters 51 with the value of the cheque. In a first use the cheque is of a fixed predetermined value. In that case the sequence of characters 51 is formed by the opaque surface portions 50 and the transparent gaps 49, insofar as the cover layer 9 FIG. 12) exposes the carrier foil 3 (FIG. 12) on the character surfaces occupied by the characters of the sequence 51. The relief structures 15 (FIG. 12) form within the surface portions 50 kinematic motifs 52 which have an optical diffraction effect, as are known for example from European patent specification EP 105 099. If the cheque is to be of a fixed predetermined value of for example 100 Francs, then the visually easily discernible sequence of characters 51 is written in the cover layer 9 for example as "*100.-*", in which case the characters of the sequence 51 interrupt some motifs 52. In the case of banknotes the sequence of characters 51 could represent the note number, while in the case of identity cards it could represent the number of the person or the signature.

The underside 4 of the carrier foil 3 is in the form of a visually discernible pattern which includes an item of information which is dependent on location along a direction x. That information is to be easy to check for a person who is checking the authenticity of the cheque. In the illustrated example this function is performed by letters 53 arranged in an alphabetical sequence. The surface occupied by an individual letter 53 has the relief structures 10 (FIG. 12) so that the letters 53 light in different colours depending on the respective direction of incidence of the light which impinges through the gaps 49 from the top side 5 of the carrier foil 3. The surface between the letters 53 is for example in the form of a matt structure or a reflecting smooth surface 46 (FIG. 12) so that it appears dark. Therefore, parts of the pattern on the underside 4 are visible within the area of the characters of the sequence 51 through the carrier foil 3. As the pattern contains an item of information which is dependent on location and which can be easily checked, it is possible immediately to recognise a forged cheque in which a character of the sequence of digits 51 is replaced by a character of another cheque or in which the sequence of the digits is interchanged.

Instead of the alphabetically arranged letters it is also possible to arrange characters or sequences of digits in juxtaposed relationship in a predetermined sequence, wherein each character or each series of digits symbolises another decade of the decimal system. If the cheque is of the value "100" then the character for the first decade must be visible in the right-hand zero, the character for the second decade must be visible in the central zero and the character for the third decade must be visible in the one, otherwise the cheque is void. The characters for the decades and the characters 51 representing the value of the cheque must in this case be arranged in proper register relationship.

In a particularly advantageous embodiment the information carrier 1 has a stripe 54 which is not covered by the cover layer 9 so that the information which is dependent on location on the underside 4 is visible through the carrier foil 3. The lateral view into the composite laminate 2, shown in FIG. 13, is possible only in the case of this drawing which is not to scale. In actual fact the thickness of the composite laminate 2 is so small that a lateral view thereinto is not possible.

In a use in which the cheque is produced in the form of a blank cheque, that is to say without a fixedly predetermined value, the value of the check must be written into the cover layer 9 by the drawer by means of a suitable device. The metallic cover layer 9 is locally irreversibly altered by the application of mechanical, thermal or optical energy or chemical etching agents so that the cover layer 9 is milled away, vaporised away or dissolved, so that the surface treated in that way becomes transparent and the gaps 49 are produced. In that respect either the thickness d of the carrier foil 3 is sufficiently great or the cover layer 9 comprises an element or an alloy or a compound consisting of at least two elements, which in that individualisation process reacts more quickly than the material selected for the base layer 8 so that the relief structures 10 on the underside 4 are not altered.

If the composite laminate 2 in FIG. 14 of that information carrier 1 has the protective lacquer layer 48, individualisation is advantageously effected by focussed laser light 55. The cover layer 9 then preferably comprises tellurium or a tellurium alloy as tellurium or the alloy has a high absorption coefficient for certain light wavelengths so that the tellurium-bearing cover layer 9 can be locally removed or the reflectivity thereof can be locally altered, without altering the material of the subjacent base layer 8. Aluminium for example can be used for the base layer 8 because it is a good reflector of light and the information carrier 1 thus provides brilliant colour effects. The laser used is for example a dye laser whose light wavelength is tuned to the absorption properties of tellurium.

The laser beam 55 is also focussed with the maximum accuracy onto the height of the tellurium-bearing cover layer 9 so that the energy for removal of the tellurium-bearing layer is concentrated at the location of the intended gap 49. For that purpose the cover layer 9 is advantageously provided at inconspicuous locations with markings which serve for focussing purposes. Because of the divergence of the laser beam 55 the energy density of the laser beam 55 in the plane of the underside 4 becomes less with an increasing thickness d of the carrier foil 3 and thus there is a reduction in the risk of unintentional damage to the relief structures 10 or the base layer 8.

The tellurium is vaporised by the focussed energy of the laser beam 55 or begins to melt locally under the protective lacquer layer 48 so that the material loses its optically high-grade surface because microscopic spheroids are formed when cooling occurs, and that becomes visually noticeable as a whole at most as a fine grey film. At the same time at those locations the protective lacquer layer 48 is bonded not dissimilarly to a welding operation to the carrier foil 3. Therefore formed in the cover layer 9 as gaps 49 are transparent surfaces whose shapes form the sequence of characters 51 ((FIG. 13). The pattern on the underside 4 is discernible through the transparent surfaces 49.

Other particularly suitable elements for the cover layer 9, instead of tellurium, are chromium, gold, copper but also silicon and germanium.

The pattern on the underside 4 of the carrier foil 3 is protected from unauthorised access of any kind so that the information which is dependent on location and which is contained in the pattern is not variable without leaving behind visually discernible traces. Because of the relief structures 10 and 15 (FIG. 12) being difficult to forge, the sequence of characters 51 and the pattern on the underside 4, in their interplay, afford a high level of protection from attempts at forgery.

Cheques with a predetermined value can also be produced by gluing together two foils of a suitable configuration, in which case the individualisation operation can be effected before or after the foils are glued together. In this case it is particularly advantageous if the relief structures 10 and 15 have items of information in correct register relationship and if the cover layer 9 has suitably placed gaps 49 so that it is easy to check by eye the correct register relationship of the items of information.

The writable information carrier 1 is also suitable as a security element on passes, identity cards etc., where for example the scanned-in signature of the rightful user is written into the cover layer 9 by means of a computer-controlled laser.

FIG. 15 shows an arrangement for embossing relief structures 10 and 15 (FIG. 12) in accurate register relationship. The arrangement includes a transport device 56 for the carrier foil 3 which is in the form of a foil strip, and two embossing cylinders 57 and 58. The two embossing cylinders 57, 58 are arranged opposite each other, with the foil strip being guided between the embossing cylinders 57, 58 so that to produce a sufficient embossing pressure they serve as backing cylinders for each other. Suitable precautions, for example a rigidly coupled drive for the two embossing cylinders 57, 58 ensure that the embossing cylinders 57, 58 rotate synchronously, whereby accurate register relationship is achieved for the relief structures 10 and 15 which are embossed into the underside 4 and the top side 5 respectively of the carrier foil 3. The embossing cylinders 57, 58 are heatable. The carrier foil 3 is advantageously in the form of a composite laminate which has a temperature-resistant carrier layer, for example of polyester, arranged between two embossable lacquer layers.

For the production of cheques with a fixed monetary value, two basic processes are known, for providing the embossed top side 5 with the structured cover layer 9 (FIG. 12), more specifically selective removal of the cover layer 9 which is applied over the entire surface area or local application of the cover layer 9. Selective removal of the cover layer 9 can be effected by using a printing procedure to apply a structured protective lacquer to the cover layer 9. The surfaces of the cover layer 9, which are not printed upon, are then removed in a solvent bath, for example by etching. Finally the protective lacquer is removed again. Local application of the cover layer 9 can be effected by those surfaces which are not to be covered by the cover layer 9 being printed upon with a lacquer layer. Thereupon the carrier foil 3 which has been treated in that way is coated over its entire surface area with the cover layer 9, for example by vapour deposition. The lacquer layer together with the cover layer 9 disposed thereon are removed by means of a washing process in a selectively attacking solvent.

FIG. 16 shows an advantageous arrangement for producing the structures 6, 7 in accurate register relationship, if that is effected by structuring of the layers 8 and 9 (FIG. 1). The arrangement includes two printing mechanisms 59, 60 which are known from the letterset process and which each have an ink bath 61 and 62 respectively, an Anilox roller 63 and 64 respectively, a print cylinder 65 and 66 respectively and a rubber cylinder 67 and 68 respectively and which are so arranged that the carrier foil 3 in the form of foil strip is guided between the two rubber cylinders 67 and 68. The print cylinders 65 and 66 which contain the print patterns are uniformly provided by way of the Anilox rollers 63, 64 with a predetermined liquid agent 69 from the ink bath 61 and 62 respectively. The agent 69 is then transferred by the cylinder 65 and 66 respectively in accordance with the corresponding print pattern onto the respective rubber cylinder 67, 68 and from same onto the corresponding surface 4, 5 (FIG. 1) of the carrier foil 3. The drive system for the two printing mechanisms 59, 60 is coupled so that the print cylinders 65, 66 and the rubber cylinders 67, 68 rotate synchronously.

The liquid agent 69 can be the above-described protective lacquer or the above-described lacquer layer. The liquid agent 69 may however also be a lye which directly dissolves the layer 8 or 9, which is possible in particular if the layers 8, 9 are thin metallic layers of for example aluminium. In that case the arrangement also has nozzles 70 which spray for example water onto the layers 8 and 9 which are already structured by means of the lye, in order to remove residues of the lye. The carrier foil 3 which is now provided with the structures 6 and 7 is dried by means of a drying device which includes for example squeeze rollers 71 and an oven 72. The arrangement advantageously also has sensors 73 for checking the register accuracy of the structures 6 and 7 so that the printing mechanisms 59, 60 can be accurately adjusted.

We claim:

1. An optical information carrier which is in the form of a composite laminate with a carrier foil and which has microscopically fine relief structures, characterised in that the carrier foil is approximately transparent for light in a predetermined spectral range, that the top side of the carrier foil is provided with a cover layer which is opaque for visible light and which is provided with openings through which light impinging on the top side can penetrate into the composite laminate, that microscopically fine relief structures are formed into the underside the carrier foil, that the underside is coated with a base layer whose refractive index differs from the refractive index of the carrier foil in at least a portion of the electromagnetic spectrum so that the relief structures on the underside at least partially reflect and diffract the light which has penetrated into the composite laminate, that the thickness of the carrier foil is at least 20 micrometers that upon turning and/or tilting the information carrier a viewer sees a changing play of colours, that the structures on the top side have microscopically fine relief structures, and that the relief structures on the top side diffract impinging light at a different angle from the relief structures on the underside.

2. An optical information carrier according to claim 1 characterised in that the base layer is a metallic reflection layer, that microscopically fine relief structures are formed into the top side of the carrier foil, that the cover layer is a reflecting layer, that the number of openings through which light can pass into and issue from the composite laminate is at last two, and that at least a part of the light which has penetrated into the composite laminate is guided within the composite laminate from the one opening to the other opening.

3. An optical information carrier which is in the form of a composite laminate with a carrier foil, characterised in that relief structures are formed into the underside of the carrier foil, that the carrier foil is approximately apparent for light in a predetermined spectral range, that the top side of the carrier foil is structured to form at least one microlens and that the thickness of the carrier foil approximately corresponds to the focal length of the microlens.

4. An optical information carrier according to claim 3 characterised in that the relief structures are subdivided into surface portions which are arranged in mutually juxtaposed relationship and that a predetermined number of surface portions is associated with each microlens.

5. An optical information carrier according to claim 4 characterised in that the surface portions can be individually illuminated by varying the direction of incidence of a light beam and that the diffraction properties of the relief structures of each surface portion can be individually irreversibly altered by applying thermal energy so that the surface portions form a ROM or a WORM.

6. An optical information carrier according to claim 3 characterised in that the relief structures on the underside form at least one reflector and that each microlens has associated therewith a reflector which together form a retroreflector which reflects light incident in parallel relationship from a direction of incidence back into the direction of incidence.

7. An optical information carrier which is in the form of a composite laminate with a carrier foil and which has microscopically fine relief structures characterised in that the carrier foil is approximately transparent for light in the visible spectral range, that identical microscopically fine relief structures are formed into the underside and the top side of the carrier foil, and that the underside and the top side, to represent a pattern ("VALID") visible only from predetermined directions, is locally and alternately coated with a reflecting base layer and an opaque cover layer respectively within the sure occupied by the pattern.

8. An optical information carrier which is in the form of a composite laminate with a carrier foil and which has microscopically fine relief structures characterised in that the carrier foil is in the form of a composite laminate comprising at least three layers wherein the central layer is a layer which permits destruction-free separation of the outer layers, that formed into the underside and the top side of the carrier foil are identical microscopically fine relief structures which are covered with a base layer and a cover layer respectively in such a way that in the separated condition a pattern ("VOID") is visible, said pattern not being visible in the non-separated condition.

9. An optical information carrier according to claim 8 characterised in that the materials for the cover layer and the base layer are so selected that the process of local formation of gaps in the cover layer does not damage the base layer or the relief structures on the underside.

10. An optical information carrier according to claim 8 characterised in that the composite laminate has a protective lacquer layer which extends over the cover layer.

11. An optical information carrier according to claim 10 characterised in that the cover layer contains tellurium and/or chromium and/or gold and/or copper and/or silicon and/or germanium and that the base layer is of aluminium.

12. An optical information carrier according to claim 10 characterised in that the cover layer can be altered by means of a laser beam which is focused onto the cover layer, so that the irradiated surface of the cover layer becomes transparent without the relief structures on the underside of the carrier foil being altered.

13. An optical information carrier according to one of claim 8 characterised in that the motifs which have an optical-diffraction effect exhibit kinematic effects.

14. An optical information carrier which is in the form of a composite laminate with a carrier foil and which has microscopically fine relief structures characterised in that the carrier foil is transparent for light in the visible spectral range, that formed on the underside of the carrier foil are microscopically fine relief structures which are coated with a base layer whose refractive index differs from the refractive index of the carrier foil in the visible spectral range so that the relief structures on the underside at least partially reflect and diffract light which has penetrated into the composite laminate, that the relief structures on the underside of the carrier foil form a pattern with information which is dependant on location, that formed on the top side of the carrier foil are microscopically fine relief structures which are covered by a cover layer, wherein the cover layer has transparent gaps and opaque surface portions so that the areas of the underside which are beneath the gaps are visible, that the relief structures on the top side of the carrier foil within the surface portions form motifs having an optical-diffraction effect and that the form of the gaps represents some information.

15. An optical information carrier which is in the form of a composite laminate with a carrier foil and which has microscopically fine relief structures characterised in that the carrier foil is transparent for light in the visible spectral range, that formed on the underside of the carrier foil are microscopically fine relief structures which are coated with a base layer whose refractive index differs from the refractive index of the carrier foil in the visible spectral range so that the relief structures on the underside at least partially reflect and diffract light which has penetrated into the composite laminate, that the relief structures on the underside of the carrier foil form a first pattern with information which is dependant on location, that formed on the top side of the carrier foil form motifs having an optical diffraction effect and that the cover layer can be locally and irreversibly altered in such a way that the parts of the first pattern which are below the altered surface become visible.

16. An optical information carrier according to claim 15 characterised in that the cover layer and the base layer have optical absorption constants which are different for at least a part of the infra-red and/or visible light.

17. An optical information carrier which is in the form of a composite laminate with a carrier foil characterised in that to produce visible optical-diffraction effects the underside of the carrier foil has relief structures which are covered with a reflecting base layer, that for the storage of machine-readable information which is concealed to the human eye the top side of the carrier foil contains relief structures which are exposed or covered with a cover layer in a predetermined manner along at least one data track, and that the cover layer has a refractive index which differs from the refractive index of the carrier foil in the visible range by at most 0.2.

18. A process for the production of an optical information carrier which has a carrier foil, in the underside and top side of which are formed relief structures characterised in that for forming the relief structures the carrier foil is guided between two mutually oppositely disposed embossing cylinders, wherein the embossing cylinders mutually serve as backing cylinders.

* * * * *